US012575544B2

(12) United States Patent
Liang et al.

(10) Patent No.: US 12,575,544 B2
(45) Date of Patent: Mar. 17, 2026

(54) QUICK DETACHABLE AND INSTALLABLE CAT TREE FLOOR PLATE STRUCTURE AND CAT TREE

(71) Applicant: Shenzhen Libro Technology Co., Ltd., Shenzhen (CN)

(72) Inventors: Zhixiong Liang, Shenzhen (CN); Chao Yan, Shenzhen (CN); Kangjun Huang, Shenzhen (CN)

(73) Assignee: Shenzhen Libro Technology Co., Ltd., Shenzhen (CN)

( * ) Notice: Subject to any disclaimer, the term of this patent is extended or adjusted under 35 U.S.C. 154(b) by 369 days.

(21) Appl. No.: 18/386,998

(22) Filed: Nov. 3, 2023

(65) Prior Publication Data

US 2024/0215533 A1      Jul. 4, 2024

(30) Foreign Application Priority Data

Jan. 3, 2023      (CN) ......................... 202320039748.7
Aug. 2, 2023      (CN) ......................... 202322078105.6

(51) Int. Cl.
  *A01K 15/02*      (2006.01)
  *F16B 5/00*      (2006.01)
  *F16B 9/02*      (2006.01)
(52) U.S. Cl.
  CPC .......... *A01K 15/024* (2013.01); *F16B 5/0084* (2013.01); *F16B 9/02* (2013.01)
(58) Field of Classification Search
  CPC .... A01K 15/02; A01K 15/024; A01K 15/025; A01K 15/0257; F16B 5/0016;
(Continued)

(56) References Cited

U.S. PATENT DOCUMENTS 3,932,047 A * 1/1976 Crossan .................... F16B 9/09
                                                    403/387
5,875,735 A * 3/1999 Bradley ............... A01K 15/024
                                                    119/706
(Continued)

FOREIGN PATENT DOCUMENTS

CN      204443585 U * 7/2015 ............. A01K 15/02
CN      211064624 U * 7/2020 ............. A01K 15/02
(Continued)

*Primary Examiner* — Amber R Anderson

*Assistant Examiner* — Kevin J Baynes

(74) *Attorney, Agent, or Firm* — Ware, Fressola, Maguire & Barber LLP

(57)                ABSTRACT

A quick detachable and installable cat tree floor plate structure which includes amounting post, a floor plate body and a locking part for quick detachment. The mounting post is provided with a mounting boss. The locking part has a locking position and a detachable position and is in sliding fit with the floor plate body to allow the locking part to reciprocate between the locking position and the detachable position. When the locking part is located in the locking position, a snapping groove that is laterally opened is formed between the floor plate body and the locking part for quick detachment to snap the mounting boss into the snapping groove. When the locking part is located in the detachable position, the floor plate body is movable upward relative to the mounting boss and detachable from the mounting boss.

20 Claims, 19 Drawing Sheets

(58) Field of Classification Search
CPC ...... F16B 5/008; F16B 5/0084; F16B 5/0664;
F16B 5/126; F16B 9/02; F16B 9/09;
F16B 12/26; F16B 12/38
See application file for complete search history.

(56) References Cited

U.S. PATENT DOCUMENTS

| | | | | |
|---|---|---|---|---|
| 5,884,586 | A * | 3/1999 | Carbonelli | A01K 15/024 |
| | | | | 119/485 |
| 6,966,277 | B2 * | 11/2005 | DeRaspe-Bolles | |
| | | | | A01K 15/024 |
| | | | | 119/702 |
| 9,198,399 | B1 * | 12/2015 | Grooms | A01K 15/025 |
| 12,239,097 | B2 * | 3/2025 | Farley | A01K 1/035 |
| 2002/0179021 | A1 * | 12/2002 | DeRaspe-Bolles | A01K 1/035 |
| | | | | 119/706 |
| 2014/0033987 | A1 * | 2/2014 | Hoffman | A01K 1/035 |
| | | | | 119/706 |
| 2017/0241142 | A1 * | 8/2017 | Catt | E04F 11/1041 |
| 2019/0230896 | A1 * | 8/2019 | Goldman | A01K 1/035 |
| 2019/0323531 | A1 * | 10/2019 | Wang | F16B 7/042 |
| 2020/0146256 | A1 * | 5/2020 | Chen | F16B 5/0012 |
| 2021/0329887 | A1 * | 10/2021 | Kellogg | F16B 9/02 |
| 2023/0059223 | A1 * | 2/2023 | Cui | A01K 15/02 |
| 2024/0107976 | A1 * | 4/2024 | Song | A01K 15/024 |

FOREIGN PATENT DOCUMENTS

| | | | | | |
|---|---|---|---|---|---|
| CN | 215992346 | U | * | 3/2022 | A01K 15/02 |
| KR | 20230001429 | U | * | 7/2023 | A01K 15/025 |

* cited by examiner

A

B

13

14

D

QUICK DETACHABLE AND INSTALLABLE CAT TREE FLOOR PLATE STRUCTURE AND CAT TREE

CROSS-REFERENCE TO RELATED APPLICATIONS

The present application claims priority to Chinese Patent Application No. 2023220781056, filed on Aug. 2, 2023, which claims priority to Chinese Patent Application No. 2023200397487, filed on Jan. 3, 2023, the contents of which are incorporated herein by reference in their entireties.

TECHNICAL FIELD

The present disclosure relates to the technical field of pet toys, in particular to a quick detachable and installable cat tree floor plate structure, and a cat tree.

BACKGROUND

At present, families with pet cats generally place cat trees at home for the pet cats to play and rest. The existing cat tree generally includes support posts and floor plates, and the support posts are generally connected to the floor plates by screws. That is, threaded holes of the floor plates need to be aligned with threaded holes of the support posts at first, and then the screws are screwed into the threaded holes by a screwdriver, to fix the floor plates and the support posts together. When the floor plates need to be detached, the screws also need to be unscrewed from the threaded holes by the screwdriver. This causes that installing and detaching of the floor plates need to rely on an installation tool such as the screwdriver, and thus the installing and detaching of the floor plates highly rely on the installation tool. Moreover, the floor plates are connected to each other by the screws, and it is necessary for a user to turn the screwdriver for many times to screw the screws into or out of the threaded holes, which is tedious in operation and takes a long time.

In view of this, it is necessary to provide a new quick detachable and installable cat tree floor plate structure and a cat tree, to solve or at least alleviate the above technical defects.

SUMMARY

The main purpose of the present disclosure is to provide a quick detachable and installable cat tree floor plate structure and a cat tree, which is intended to solve the technical problems that the installing and detaching of the existing cat tree highly relies on external installation tools, and the installing and detaching process is tedious and time-consuming.

In order to achieve this purpose, the present disclosure provides a quick detachable and installable cat tree floor plate structure, including:

a mounting post provided with a mounting boss;

a floor plate body; and at least one locking part for quick detachment, the locking part for quick detachment has a locking position and a detachable position, the locking part for quick detachment is in sliding fit with the floor plate body to allow the locking part for quick detachment to reciprocate between the locking position and the detachable position, when the locking part for quick detachment is located in the locking position, a snapping groove that is laterally opened is formed between the floor plate body and the locking part for quick detachment to snap the mounting boss into the snapping groove; and when the locking part for quick detachment is located in the detachable position, the floor plate body is movable upward relative to the mounting boss and detachable from the mounting boss.

In an embodiment, the floor plate body is provided with at least one annular limiting groove, an outer edge of the mounting boss is provided with an annular protrusion configured to be snapped into the annular limiting groove.

In an embodiment, the floor plate body is provided with two annular limiting grooves, and the two annular limiting grooves are arranged opposite to each other at two ends of the floor plate body. The number of locking part for quick detachments is the same as the number of the annular limiting grooves, and the locking part for quick detachments are arranged in one-to-one correspondence with the annular limiting grooves.

In an embodiment, the floor plate body includes a bottom plate and a snapping member connected to each other. The snapping member includes a snapping portion. The snapping portion includes a mounting sub-portion, a connecting sub-portion and a snapping sub-portion connected to each other in sequence. The mounting sub-portion is connected to the bottom plate. The mounting sub-portion, the connecting sub-portion and the snapping sub-portion together define the annular limiting groove. A top surface of the mounting boss is provided with an annular groove. The snapping sub-portion is configured to be snapped into the annular groove, and an inner side of the mounting sub-portion is configured to abut against an outer wall of the mounting boss.

In an embodiment, the locking part for quick detachment includes a locking plate provided with a first stop protrusion, the floor plate body is provided with a second stop protrusion, and the second stop protrusion is configured to abut against the first stop protrusion to limit a travel of the locking plate.

In an embodiment, a side of the locking part for quick detachment away from the floor plate body is provided with an elongated protrusion extending in a front-rear direction.

In an embodiment, the floor plate body is provided with a limiting block, and the limiting block is provided with a first groove and a second groove on a side of the limiting block facing toward the locking part for quick detachment. The first groove is arranged corresponding to the locking position, and the second groove is arranged corresponding to the detachable position. The locking part for quick detachment is provided with a limiting protrusion configured to be snapped into the first groove or the second groove. When the locking part for quick detachment is located in the locking position, the limiting protrusion is snapped into the first groove.

In an embodiment, the quick detachable and installable cat tree floor plate structure further includes a top plate and a fixing assembly. The top plate is arranged above the floor plate body. The fixing assembly includes a fixing member, a connecting member and a rotating member. The connecting member is connected to the fixing member. A top surface of the top plate is provided with an accommodating groove for accommodating the fixing member. A bottom of the accommodating groove is provided with a first through hole for the passage of the connecting member and the rotating member. The floor plate body is provided with a second through hole for the passage of the rotating member, the second through hole is arranged corresponding to the first through hole. The rotating member is rotatably connected to the connecting member to allow a top surface of the rotating member to abut against a bottom surface of the floor plate body.

Furthermore, the present disclosure also provides a cat tree, including a mounting plate and the quick detachable and installable cat tree floor plate structure described above, the mounting post is detachably connected to the mounting plate.

In an embodiment, the quick detachable and installable cat tree floor plate structure further includes a decorated component, the decorated component includes a mount and a pendant connected to each other, the mount is snapped into the floor plate body, and the pendant is provided with an aperture; and/or the cat tree includes at least two quick detachable and installable cat tree floor plate structures, the cat tree further includes mounting plates and connecting plates, bottoms of mounting posts are connected to the mounting plates, and each of the connecting plates is configured to connect any two mounting plates with each other.

In the technical solutions of the present disclosure described above, when the floor plate body needs to be installed on the mounting boss, the locking part for quick detachment located in the detachable position is moved to the locking position, to form a snapping groove between the floor plate body and the locking part for quick detachment. By means of the snap of the mounting boss into the snapping groove, the floor plate body and the locking part for quick detachment are fixed on the mounting boss. When the floor plate body needs to be detached from the mounting boss, it is only necessary to move the locking part for quick detachment from the locking position to the detachable position. Since the locking part for quick detachment is detached from the mounting boss, the floor plate body is movable upward relative to the mounting boss and detachable from the mounting boss, to realize the detachment of the floor plate body. No additional external tools are required for the entire installing and detaching process of the floor plate body, and the operation is simpler and the time-consuming is less.

BRIEF DESCRIPTION OF THE DRAWINGS

In order to more clearly explain embodiments of the present disclosure or technical solutions in the related art, the drawings required to be used in the description of the embodiments or the related art will be briefly introduced below. It is obvious that the drawings described below are only some embodiments of the present disclosure, and other drawings can be obtained by those of ordinary skill in the art without any creative effort according structures shown in the drawings described below.

LIST OF REFERENCE SYMBOLS

| 1 | quick detachable and installable cat tree floor plate structure | 11 | mounting post |
|---|---|---|---|
| 111 | mounting boss | 1111 | annular groove |
| 1112 | annular protrusion | 12 | floor plate body |
| 121 | bottom plate | 1211 | plate body |
| 12111 | slide rail | 12112 | supporting block |
| 12113 | second stop protrusion | 1212 | limiting block |
| 12121 | first groove | 12122 | second groove |
| 1213 | locking position | 1214 | detachable position |
| 1215 | locking mark | 1216 | unlocking mark |
| 1217 | second through hole | 1218 | mounting groove |
| 1219 | exposure hole | 122 | snapping member |
| 1221 | snapping portion | 12211 | mounting sub-portion |
| 12212 | connecting sub-portion | 12213 | snapping sub-portion |
| 12214 | annular limiting groove | 1222 | reinforcing portion |
| 123 | top plate | 1231 | accommodation groove |
| 1232 | first through hole | 1233 | storage groove |
| 13 | locking part for quick detachment | 131 | locking plate |
| 132 | main body portion | 1321 | chute |
| 1322 | first stop protrusion | 133 | abutment portion |
| 134 | elongated protrusion | 135 | limiting protrusion |
| 14 | fixing assembly | 141 | fixing member |
| 1411 | connecting groove | 142 | connecting member |
| 143 | rotating member | 15 | snapping groove |
| 2 | cat tree | 21 | decorated component |
| 211 | mount | 2111 | rotary snapping element |
| 212 | pendant | 2121 | aperture |
| 22 | connecting plate | 23 | mounting plate |

The implementation of the purpose, the functional characteristics and the advantages of the present disclosure will be further explained with reference to the drawings in combination with the detailed description.

DETAILED DESCRIPTION

The technical solutions in embodiments of the present disclosure will be clearly and completely described in combination with the drawings in the embodiments of the present disclosure. Obviously, the described embodiments are only some of the embodiments of the present disclosure, but not all of the embodiments. All other embodiments obtained by those of ordinary skill in the art based on the embodiments in the present disclosure without any creative effort belong to the scope of protection of the present disclosure.

Figure 1:
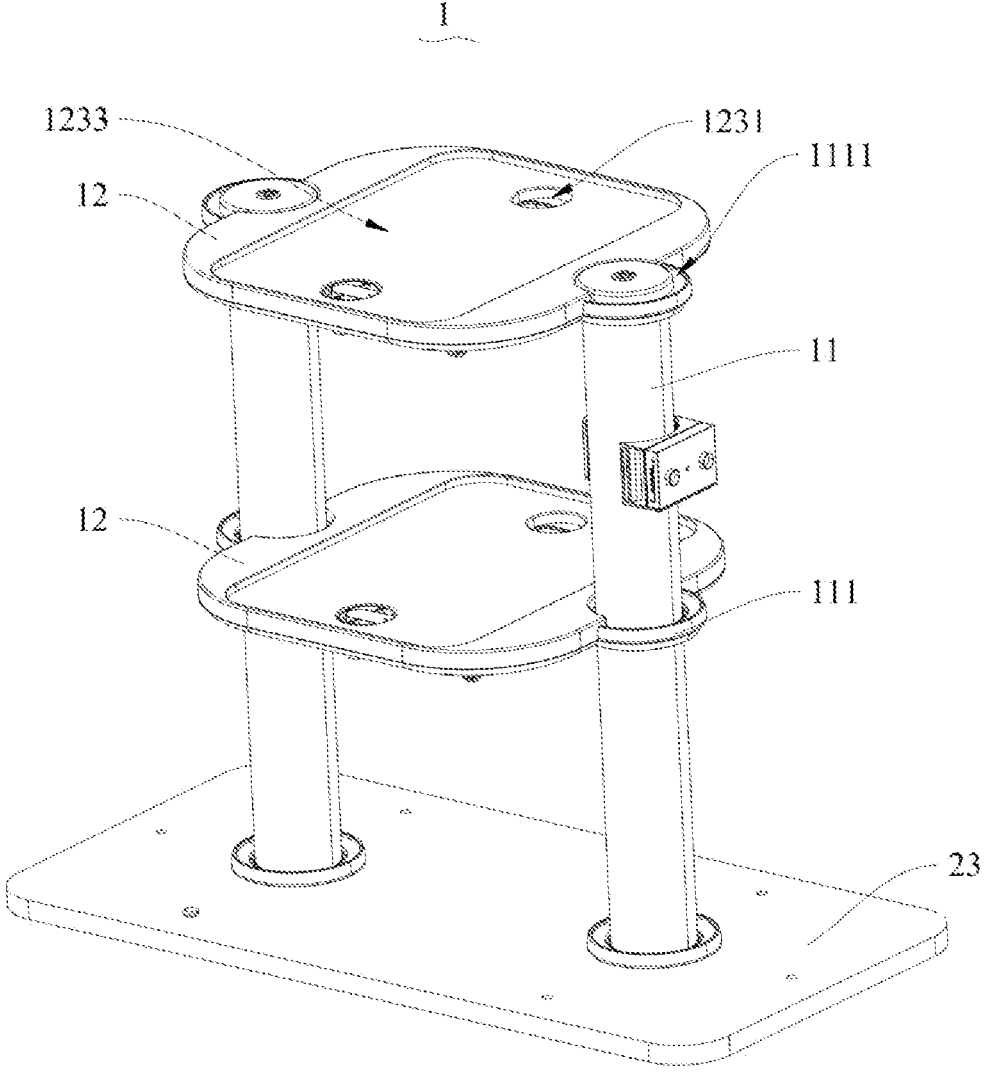
FIG. 1 is a structural schematic view of a quick detachable and installable cat tree floor plate structure according to an embodiment of the present disclosure.
Figure 2:
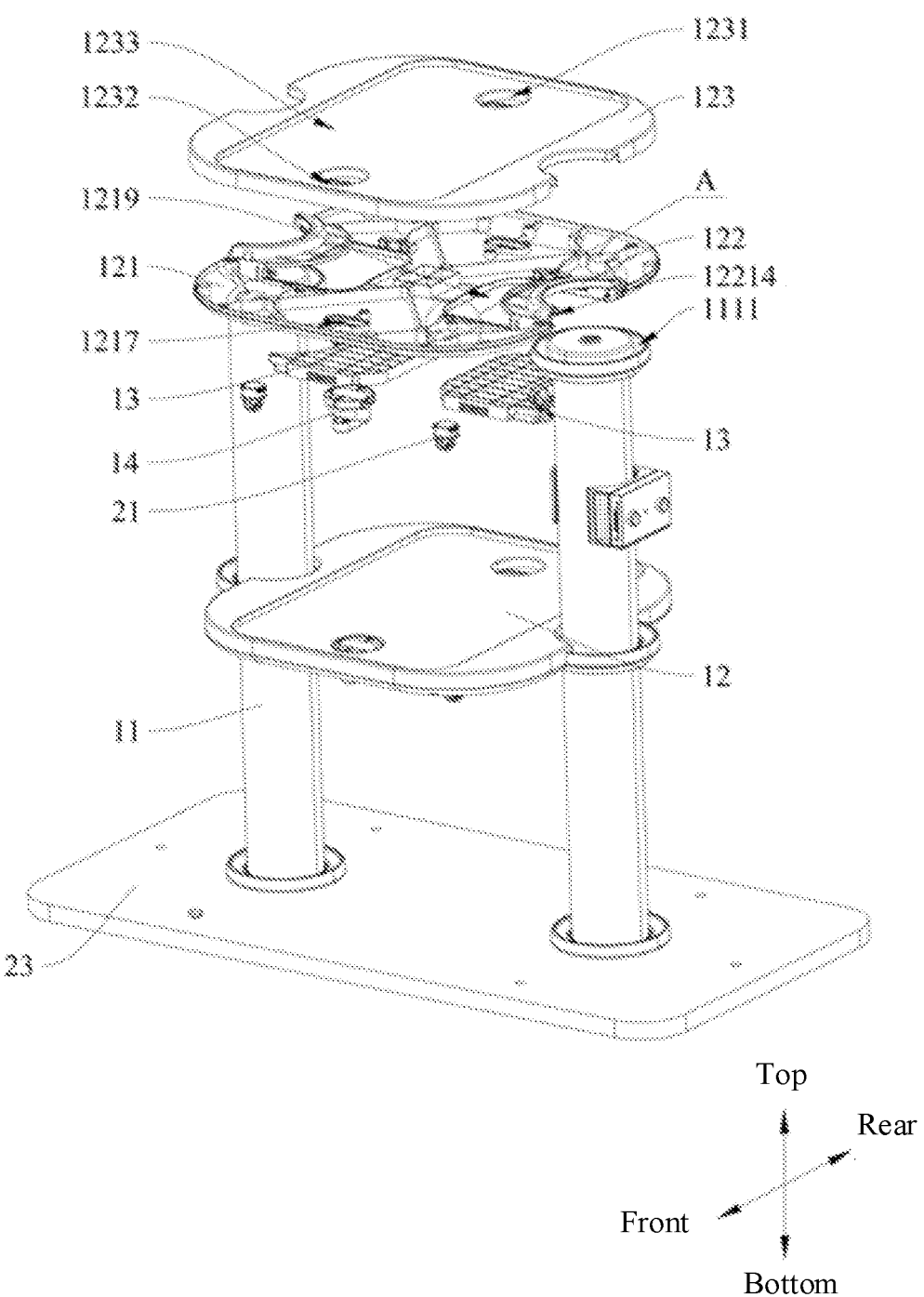
FIG. 2 is a partial structural exploded schematic view of a quick detachable and installable cat tree floor plate structure according to an embodiment of the present disclosure.
Figure 3:
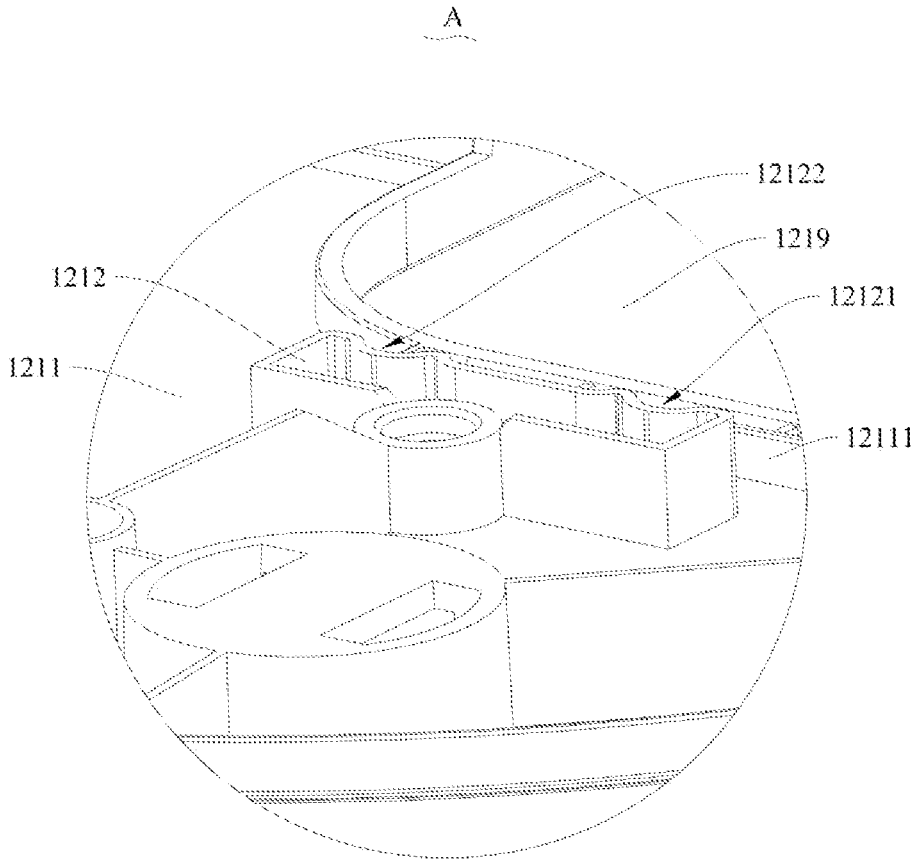
FIG. 3 is an enlarged partial schematic view of FIG. 2 at location A.
Figure 4:
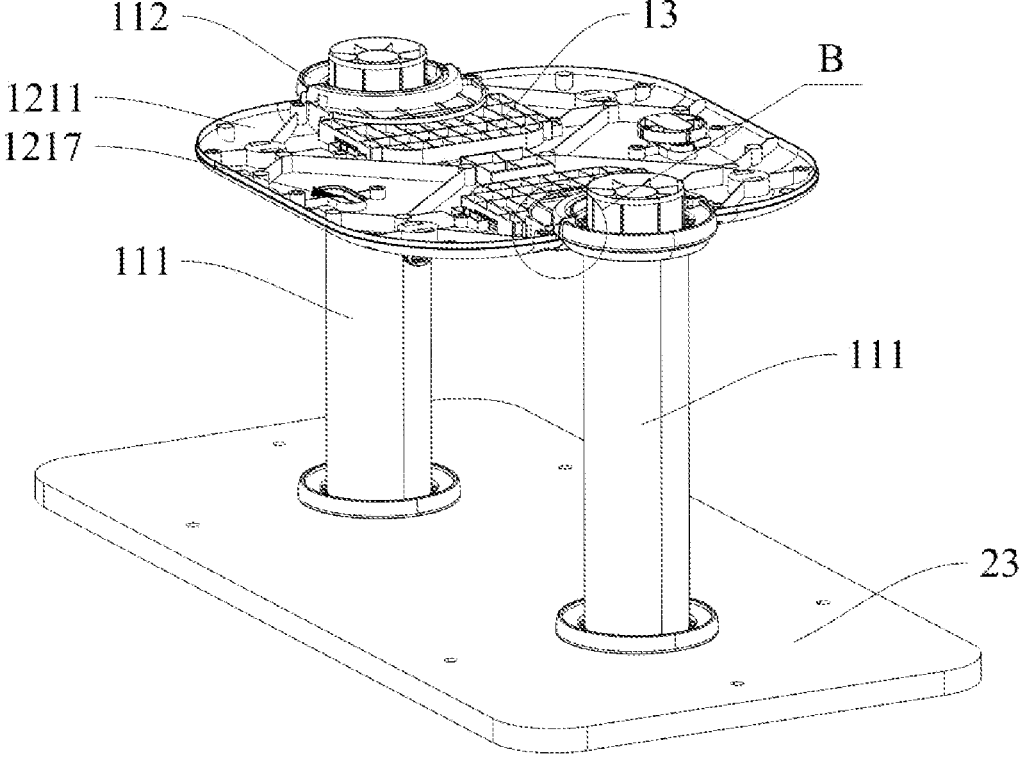
FIG. 4 is a partial structural schematic view of a quick detachable and installable cat tree floor plate structure according to an embodiment of the present disclosure.
Figure 5:
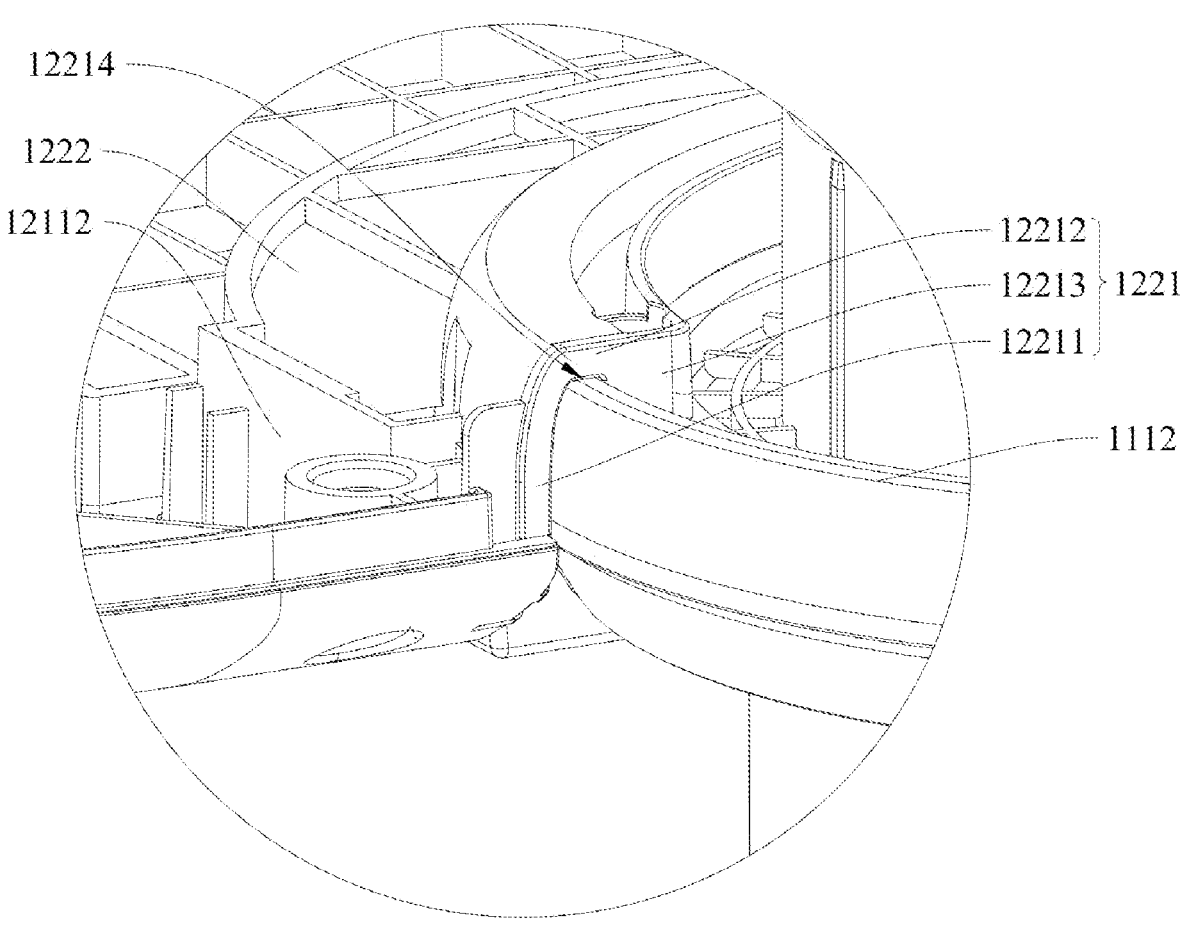
FIG. 5 is an enlarged partial schematic view of FIG. 4 at location B.
Figure 6:
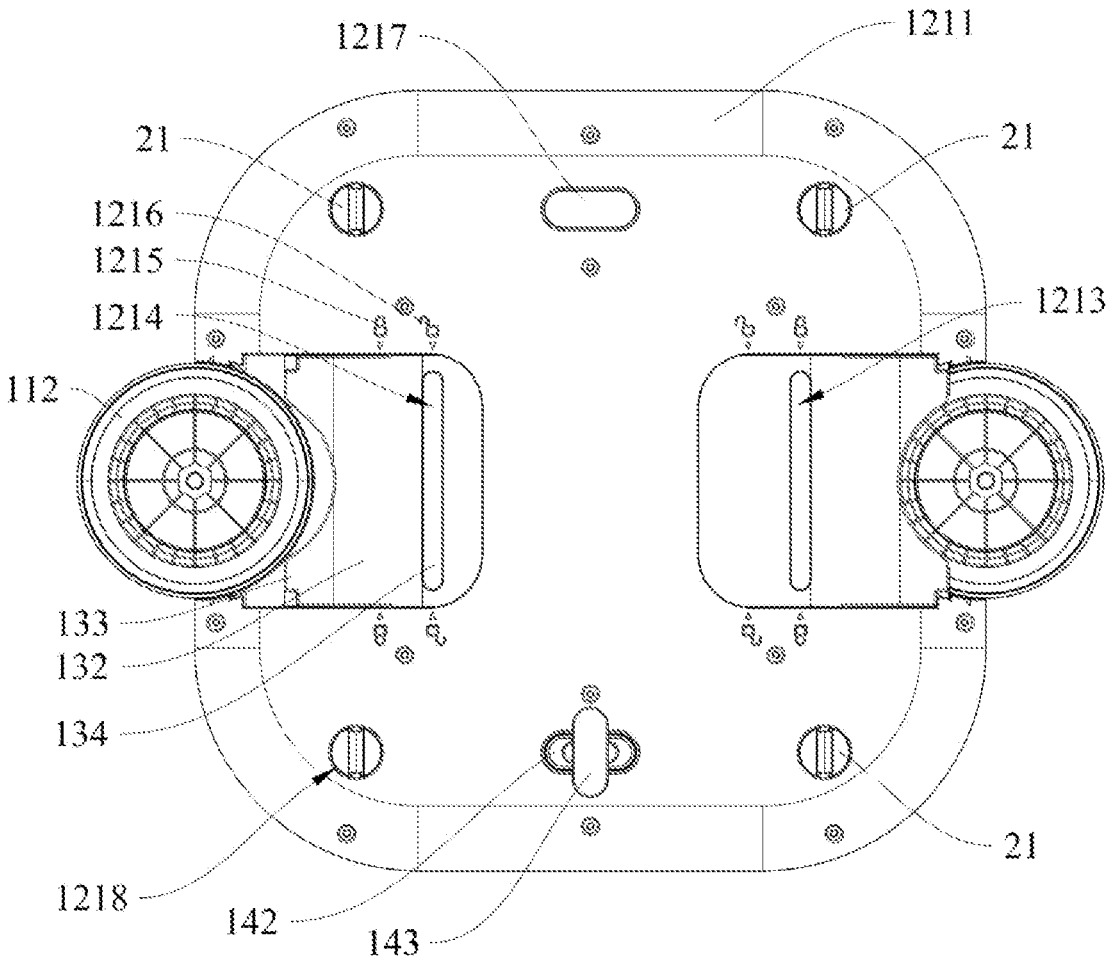
FIG. 6 is a bottom view of a part of a quick detachable and installable cat tree floor plate structure according to an embodiment of the present disclosure.
Figure 7:
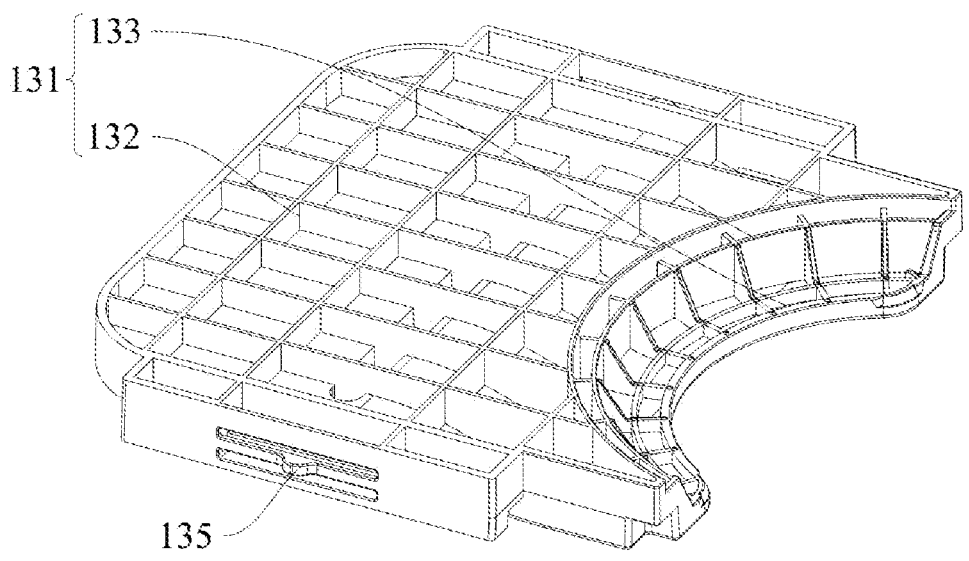
FIG. 7 is a structural schematic view of a locking part for quick detachment according to an embodiment of the present disclosure.
Figure 8:
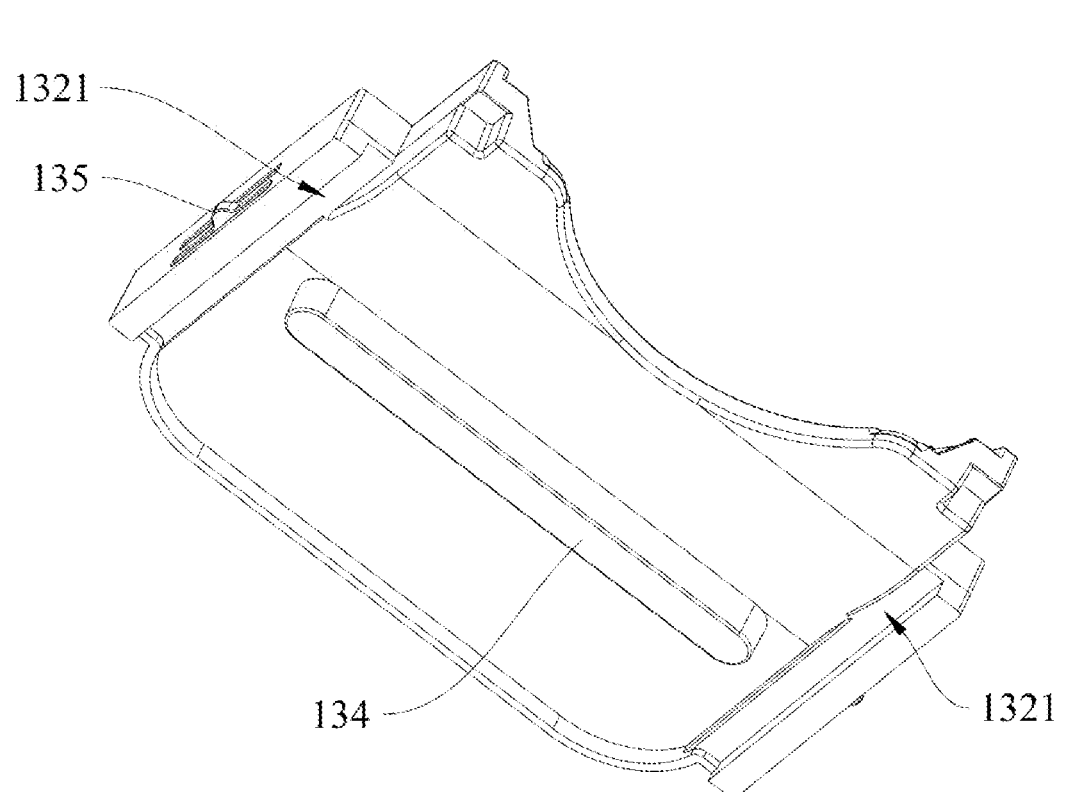
FIG. 8 is a structural view of FIG. 7 from another angle of view.
Figure 9:
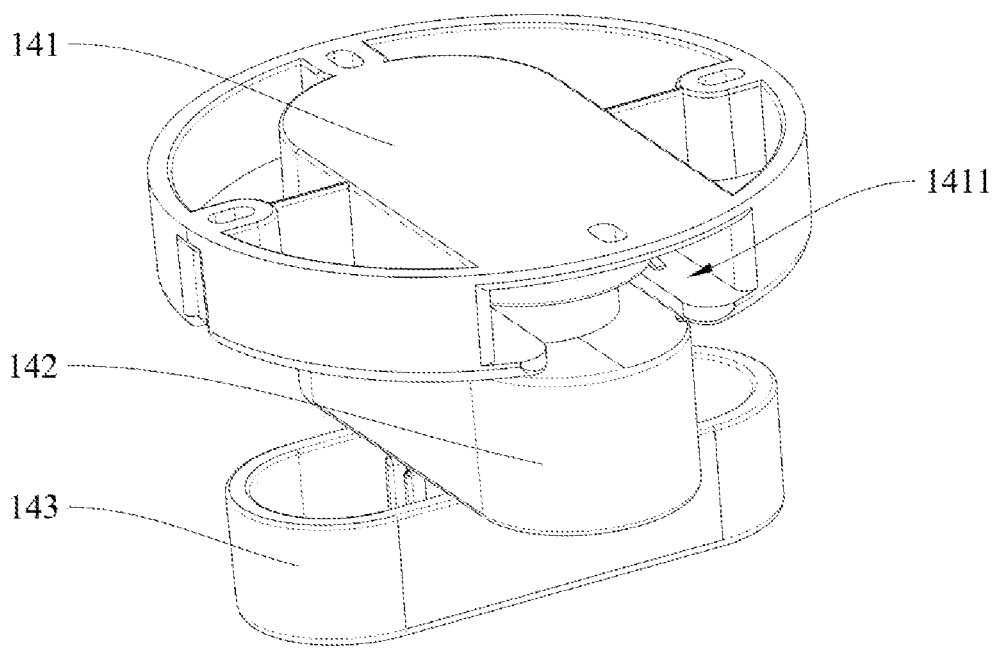
FIG. 9 is a structural schematic view of a fixing assembly according to an embodiment of the present disclosure.
Figure 10:
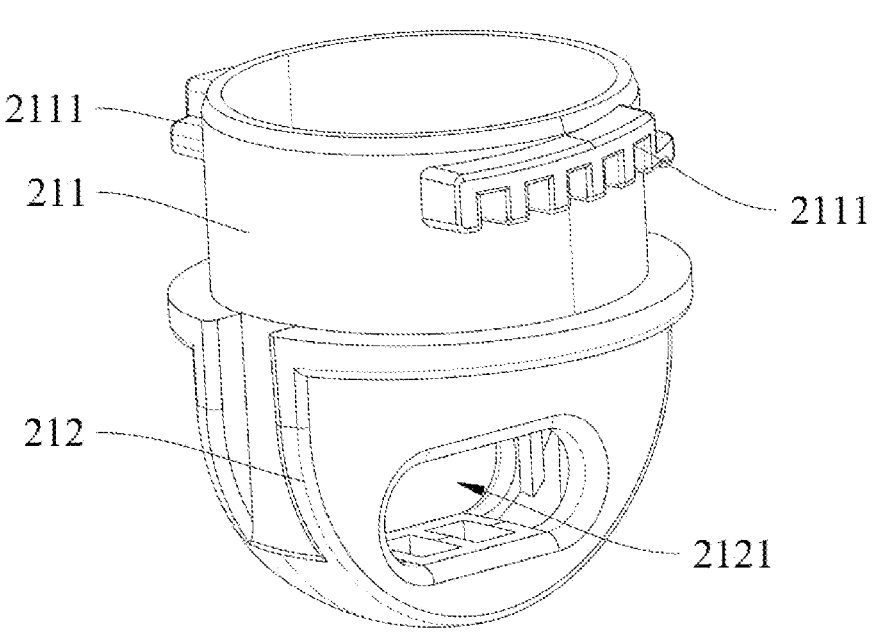
FIG. 10 is a structural schematic view of a decorated component according to an embodiment of the present disclosure.
Figure 11:
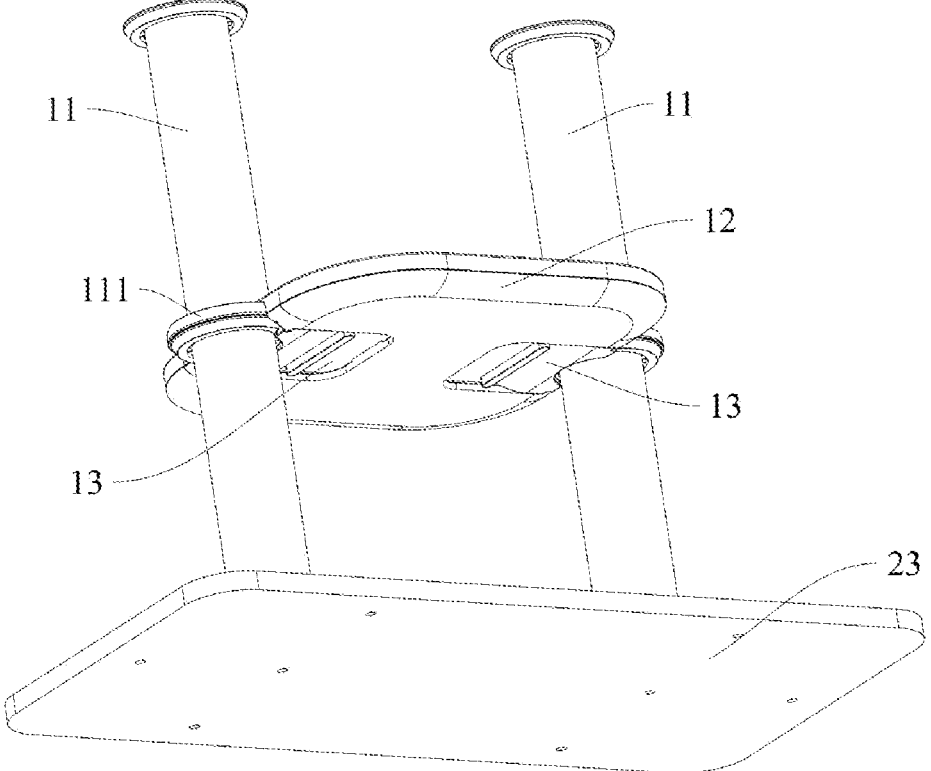
FIG. 11 is a structural schematic view of a quick detachable and installable cat tree floor plate structure and a mounting plate according to an embodiment of the present disclosure.
Figure 12:
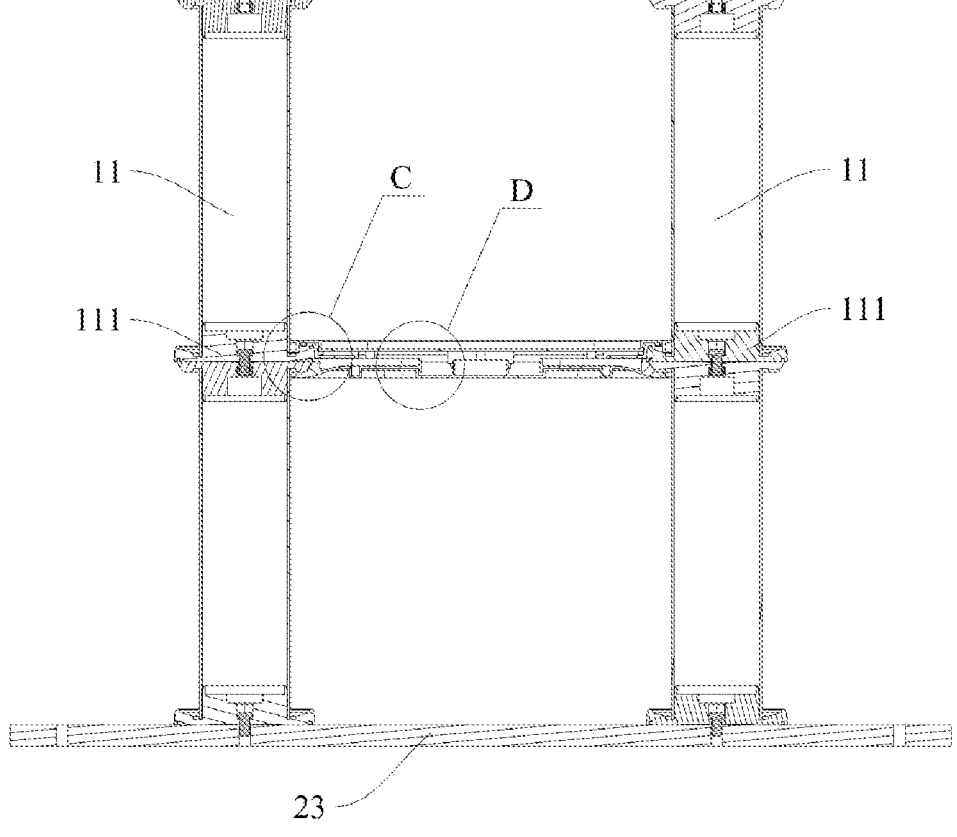
FIG. 12 is a schematic cross-sectional view of FIG. 11.
Figure 13:
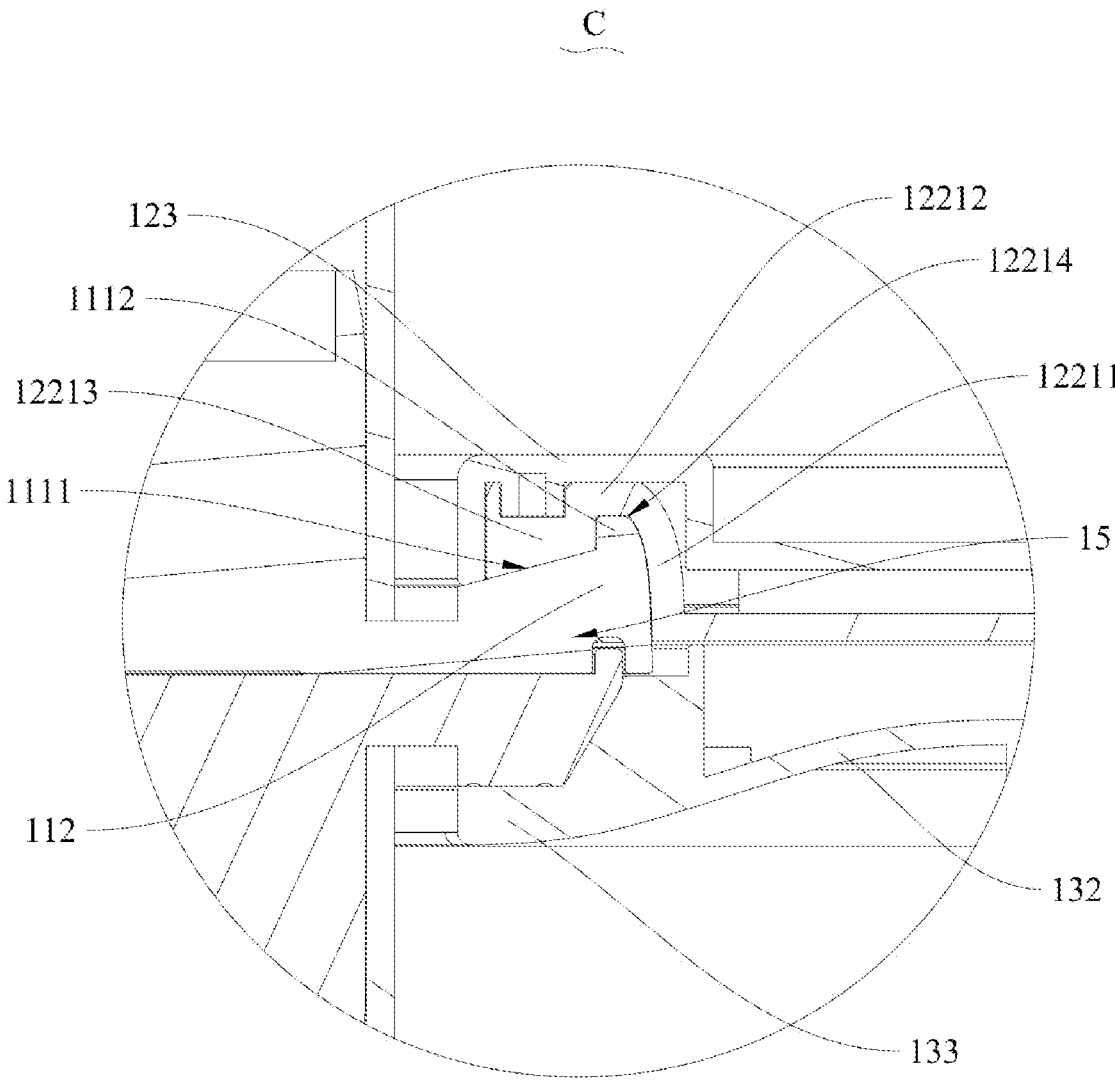
FIG. 13 is an enlarged partial schematic view of FIG. 12 at location C.
Figure 14:
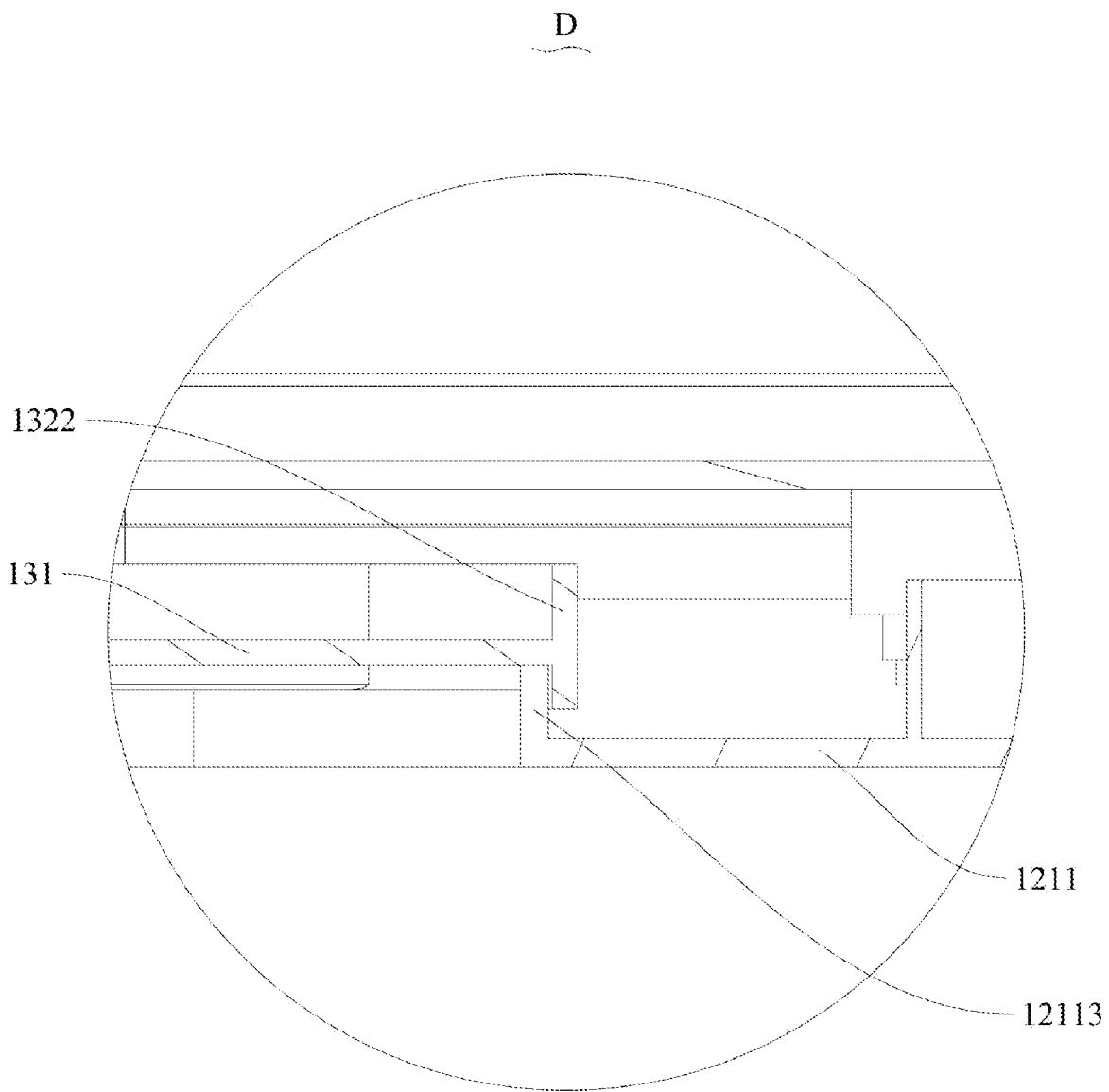
FIG. 14 is an enlarged partial schematic view of FIG. 12 at location D.
Figure 15:
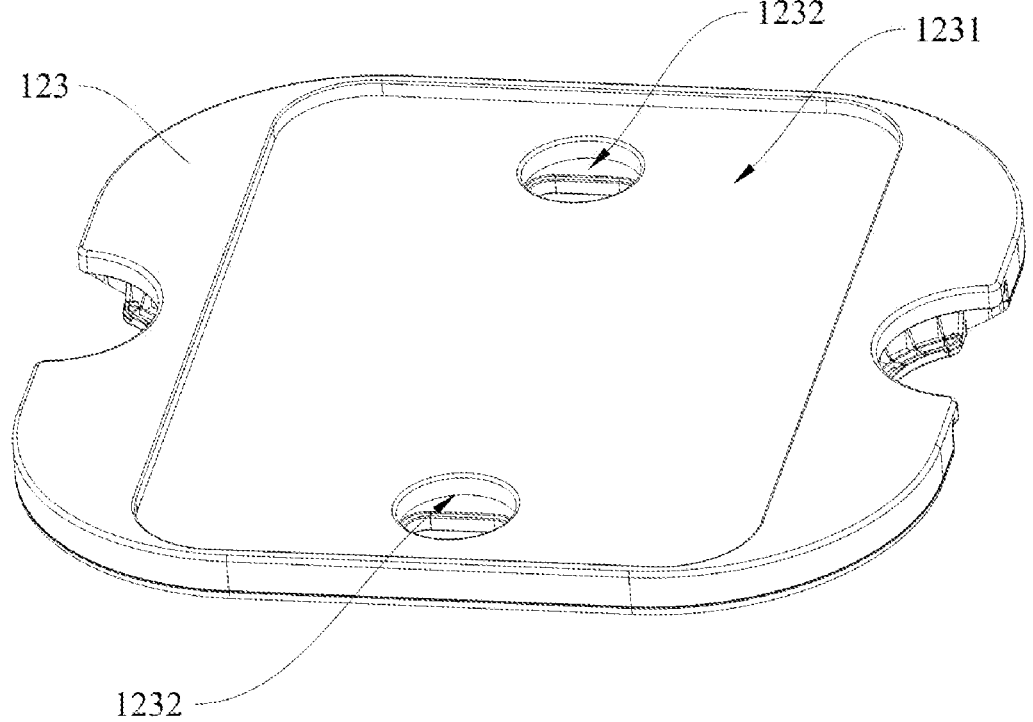
FIG. 15 is a partial structural schematic view of a quick detachable and installable cat tree floor plate structure according to an embodiment of the present disclosure.
Figure 16:
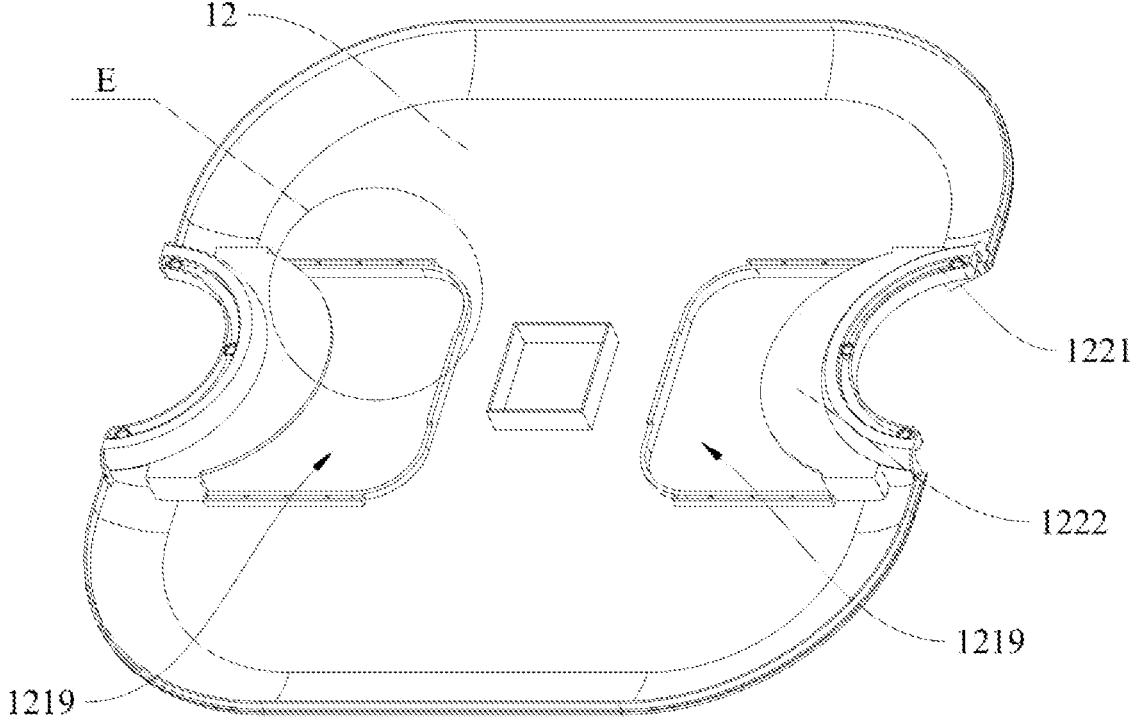
FIG. 16 is a structural schematic view of a floor plate body according to an embodiment of the present disclosure.
Figure 17:
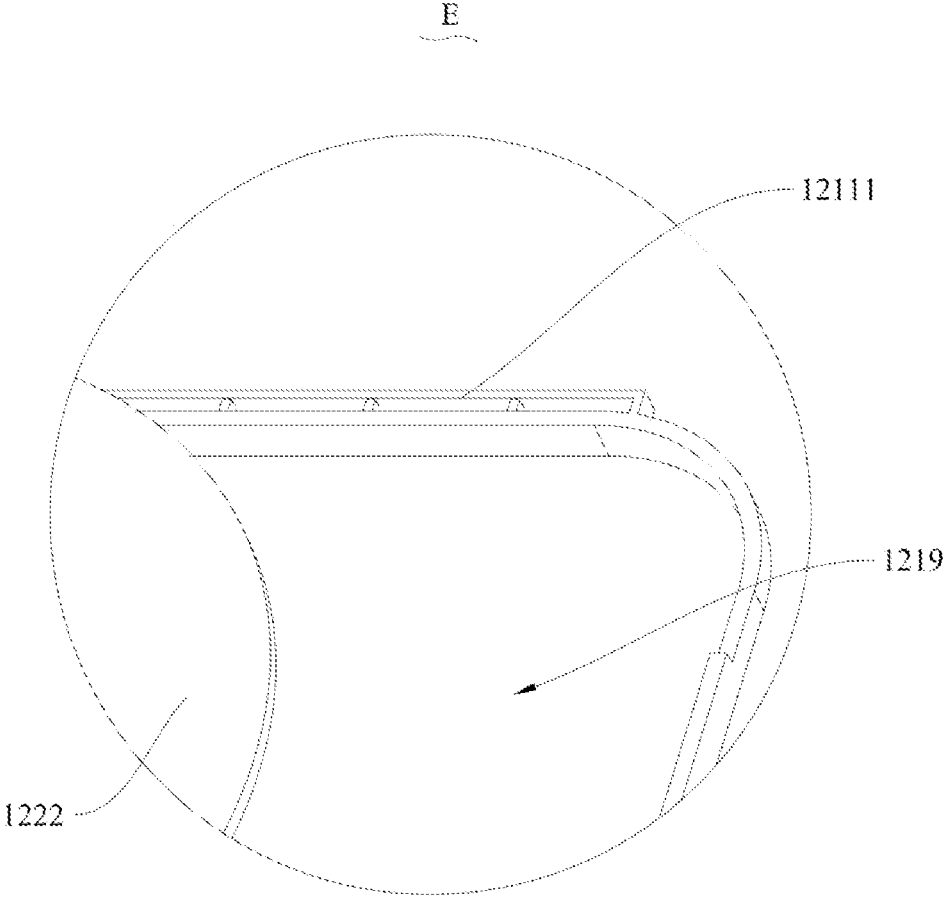
FIG. 17 is an enlarged partial schematic view of FIG. 16 at location E.
Figure 18:
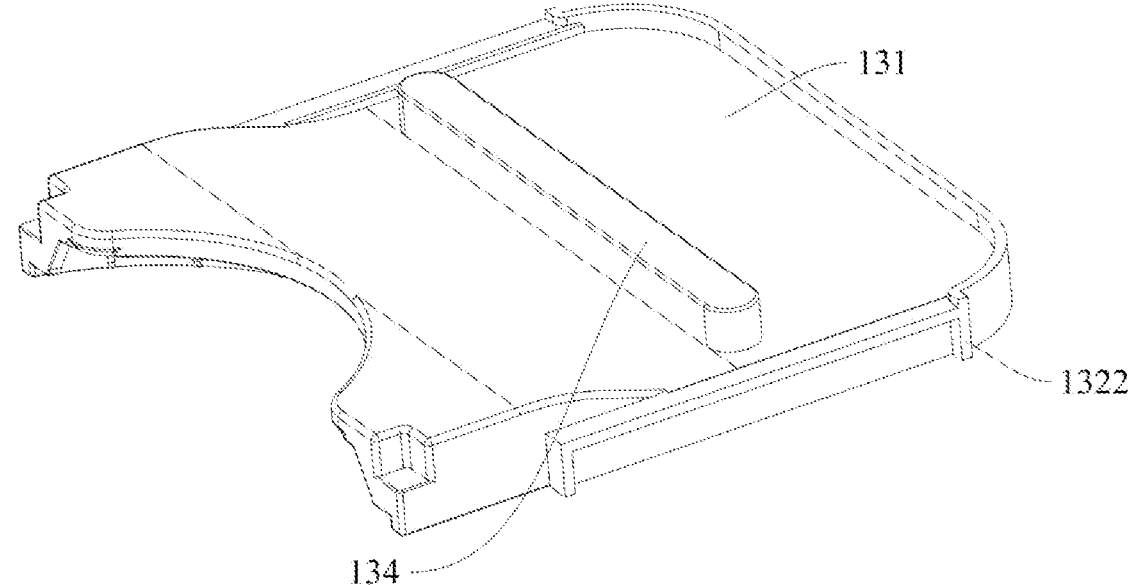
FIG. 18 is a structural schematic view of a locking part for quick detachment according to an embodiment of the present disclosure.
Figure 19:
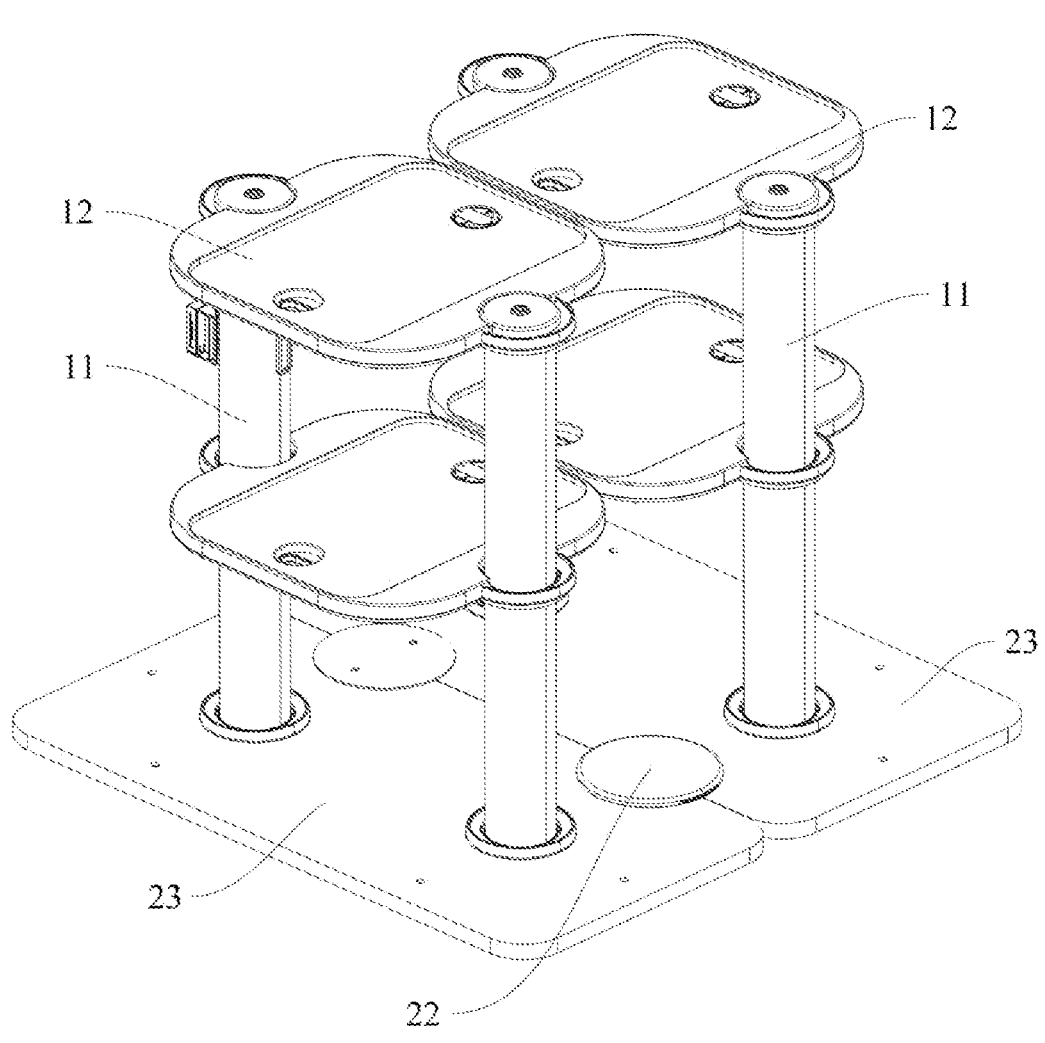
FIG. 19 is a partial structural schematic view of a cat tree according to an embodiment of the present disclosure.

It should be noted that all directionality indications (such as up, down, front and back) in the embodiments of the present disclosure are only intended to explain relative position relationships and movement situations of various components in a specific posture (as shown in FIG. 2). If the specific posture is changed, the directionality indications are changed accordingly.

In addition, the expressions such as "first", "second" and the like in the present disclosure are for descriptive purposes only, and should not be understood as indicating or implying their relative importance or implicitly indicating the number of indicated technical features. Therefore, the features defined with "first", "second" can explicitly or implicitly include at least one of the features.

In addition, the technical solutions in the various embodiments of the present disclosure can be combined with each other, but must be realized by those of ordinary skill in the art. When the combination of the technical solutions is contradictory or cannot be realized, it should be considered that the combination of the technical solutions does not exist and is not within the scope of protection claimed by the present disclosure.

The present disclosure provides a quick detachable and installable cat tree floor plate structure 1. In an embodiment, as shown in FIG. 1 to FIG. 18, the quick detachable and installable cat tree floor plate structure 1 includes a mounting post 11, a floor plate body 12 and a locking part for quick detachment 13. The mounting post 11 is provided with a mounting boss 111. The locking part for quick detachment 13 has a locking position 1213 and a detachable position 1214. The locking part for quick detachment 13 is in sliding fit with the floor plate body 12 to allow the locking part for quick detachment 13 to reciprocate between the locking position 1213 and the detachable position 1214. When the locking part for quick detachment 13 is located in the locking position 1213, a snapping groove 15 that is laterally opened is formed between the floor plate body 12 and the locking part for quick detachment 13 to snap the mounting boss 111 into the snapping groove 15. When the locking part for quick detachment 13 is located in the detachable position 1214, the floor plate body 12 is movable upward relative to the mounting boss 111 and detachable from the mounting boss 111.

When the floor plate body 12 needs to be installed on the mounting boss 111, the locking part for quick detachment 13 located in the detachable position 1214 is moved to the locking position 1213, to form a snapping groove between the floor plate body 12 and the locking part for quick detachment 13. By means of the snap of the mounting boss 111 into the snapping groove, a sapping member 122 abuts against a top surface of the mounting boss 111 to prevent a bottom plate 121 from moving downward, and the locking part for quick detachment 13 located in the locking position 1213 abuts against a bottom surface of the mounting boss 111 to limit the bottom plate 121 from moving upward. The bottom plate 121 is fixed on the mounting boss 111 by the sapping member 122 and the locking part for quick detachment 13 to limit the bottom plate 121 from moving upward or downward relative to the mounting boss 111, to ensure the high reliability of a connection between the floor plate body 12 and the mounting boss 111. When the floor plate body 12 needs to be detached from the mounting boss 111, it is only necessary to move the locking part for quick detachment 13 from the locking position 1213 to the detachable position 1214 to separate the locking part for quick detachment 13 from the mounting boss 111. In this way, the floor plate body 12 is movable upward relative to the mounting boss 111 and detached from the mounting boss 111, to realize the detachment of the floor plate body 12. No additional external tools such as a screwdriver are required for the entire installing and detaching process of the floor plate body 12. Compared with the installing of the floor plate structure in the prior art where two threaded holes are aligned with each other at first and then the floor plate structure is installed by turning the screwdriver several times, the entire installing process or detaching process of the floor plate body 12 in this embodiment of the present disclosure has only two operations, namely, an operation of moving the locking part for quick detachment 13 and an operation of snapping the mounting boss 111 into the snapping groove. Therefore, the operation required by the present disclosure is simpler and the time-consuming is less. It should be noted that the material of the floor plate body 12 and the locking part for quick detachment 13 may be acrylonitrile-butadiene-styrene copolymer, polypropylene, polyethylene or polyvinyl chloride.

Further, in an embodiment, the floor plate body 12 is provided with an annular limiting groove 12214, an outer edge of the mounting boss 111 is provided with an annular protrusion 1112, and the annular protrusion 1112 is configured to be snapped into the annular limiting groove 12214. The snap of the annular protrusion 1112 into the annular limiting groove 12214 limits a movement of the floor plate body 12 in a radial direction of the mounting boss 111, which avoids the failure of the snap of the mounting boss 111 into the snapping groove 15 caused by the movement of the floor plate body 12 in the radial direction of the mounting boss 111. According to a preferable embodiment of the present disclosure, an annular groove 1111 is coaxially disposed with the mounting boss 111.

Further, the floor plate body 12 is provided with two annular limiting grooves 12214, and the two annular limiting grooves 12214 are arranged opposite to each other at two ends of the floor plate body 12. The number of locking part for quick detachments 13 is the same as the number of the annular limiting grooves 12214, and the locking part for quick detachments 13 are arranged in one-to-one correspondence with the annular limiting grooves 12214. When the quick detachable and installable cat tree floor plate structure includes two mounting posts 11, two annular limiting grooves 12214 and two locking part for quick detachments 13 are provided to allow each snapping groove 15 formed between a respective one of the two locking part for quick detachments 13 and the floor plate body 12 to snap a respective one of the two mounting bosses 111, to enhance the stability of the floor plate body 12. It should be noted that the quick detachable and installable cat tree floor plate structure includes a plurality of mounting posts 11, and each mounting post 11 is provided with at least one mounting boss 111.

The floor plate body 12 includes a bottom plate 121 and a snapping member 122 connected to each other. The snapping member 122 includes a snapping portion 1221.

The snapping portion 1221 includes a mounting sub-portion 12211, a connecting sub-portion 12212 and a snapping sub-portion 12213 connected to each other in sequence. The mounting sub-portion 12211 is connected to the bottom plate 121. The mounting sub-portion 12211, the connecting sub-portion 12212 and the snapping sub-portion 12213 together define the annular limiting groove 12214. The top surface of the mounting boss 111 is provided with an annular groove 1111. The snapping sub-portion 12213 is configured to be snapped into the annular groove 1111, and an inner side of the mounting sub-portion 12211 is configured to abut against an outer wall of the mounting boss 111, an end of the mounting sub-portion 12211 away from the connecting sub-portion 12212 is connected to the bottom plate 121. When the annular protrusion 1112 is snapped into the annular limiting groove 12214 (that is, a top of the annular protrusion 1112 is located in the annular limiting groove 12214), a bottom wall of the annular limiting groove 12214 abuts against the top of the annular protrusion 1112 to limit a downward movement of the bottom plate 121; and two side walls of the annular limiting groove 12214 are configured to limit a movement of the bottom plate 121 in a radial direction of the mounting boss 111. It should be noted that when the annular protrusion 1112 is snapped into the annular limiting groove 12214, a side of the mounting sub-portion 12211 facing toward the mounting boss 111 is in contact with a side wall of the mounting boss 111, to further limit the movement of the bottom plate 121 in the radial direction of the mounting boss 111 in a direction closer to the mounting boss 111. It should also be noted that the annular limiting groove 12214 is provided coaxially with the annular groove 1111.

According to an embodiment of the present disclosure, the snapping member 122 is provided with the snapping groove, and the mounting boss 111 is provided with a snapping tooth snapped into the snapping groove. When the snapping tooth is snapped into the snapping groove, a bottom surface of the snapping member 122 abuts against the top surface of the mounting boss 111 to limit the bottom plate 121 from moving downward, and the snapped tooth is snapped into the snapping groove to limit the movement of the bottom plate 121 in the radial direction of the mounting boss 111.

According to another embodiment of the present disclosure, the snapping member 122 further includes a reinforcing portion 1222 connected to the snapping portion 1221 and also connected to a plate body 1211 to improve the structural strength of the snapping member 122.

According to yet another embodiment of the present disclosure, as shown in FIG. 2 to FIG. 8, the bottom plate 121 includes a plate body 1211 and a limiting block 1212 connected to each other, and the plate body 1211 is connected to the snapping member 122. The limiting block 1212 is provided with a first groove 12121 and a second groove 12122 on a side thereof facing toward the locking part for quick detachment 13. The first groove 12121 is arranged corresponding to the locking position 1213, and the second groove 12122 is arranged corresponding to the detachable position 1214. The locking part for quick detachment 13 further includes a limiting protrusion 135. A locking plate 131 includes a main body portion 132 and an abutment portion 133. The main body portion 132 is configured to be in sliding fit with the plate body 1211. Each of the limiting protrusion 135 and the abutment portion 133 is connected to the main body portion 132. The limiting protrusion 135 is configured to be snapped into the first groove 12121 or the second groove 12122. When the locking part for quick detachment 13 is located in the locking position 1213, the limiting protrusion 135 is snapped into the first groove 12121, and the abutment portion 133 abuts against the bottom surface of the mounting boss 111. When the locking part for quick detachment 13 is located in the locking position 1213, the limiting protrusion 135 is located in the first groove 12121, and the limiting protrusion 135 is snapped into the first groove 12121, which avoids the failure of the stable connection between the floor plate body 12 and the mounting boss 111 caused by the locking part for quick detachment 13 being easily pushed, and which thus improves the reliability of the connection between the floor plate body 12 and the mounting boss 111. When the locking part for quick detachment 13 is located in the detachable position 1214, the limiting protrusion 135 is located in the second groove 12122, and the limiting protrusion 135 is snapped into the second groove 12122. It should be noted that the plate body 1211 is provided with a slide rail 12111, the main body portion 132 is provided with a chute 1321, and the slide rail 12111 is configured to be in sliding fit with the chute 1321.

According to an embodiment of the present disclosure, the bottom plate includes two limiting blocks 1212 arranged at front and back sides of the main body portion 132 and arranged opposite to each other. The number of limiting protrusions 135 is the same as the number of the limiting blocks 1212, and the limiting protrusions 135 are arranged in one-to-one correspondence with the limiting blocks 1212. Since the two limiting blocks 1212 together limit the movement of the locking part for quick detachment 13, moving the limiting protrusions 135 out of the first groove 12121 or the second groove 12122 requires a large force to push the limiting protrusions 135, which effectively avoids the failure of the stable connection between the floor plate body 12 and the mounting boss 111 caused by the pet being able to easily push the locking part for quick detachment 13 to move.

In an embodiment, the locking part for quick detachment 13 includes a locking plate 131, the locking plate 131 is provided with a first stop protrusion 1322, and the floor plate body 12 is provided with a second stop protrusion 12113. The second stop protrusion 12113 is configured to abut against the first stop protrusion 1322 to limit a travel of the locking plate 131. The main body portion 132 is provided with the first stop protrusion 1322, the plate body 1211 is provided with a supporting block 12112 and the second stop protrusion 12113, and the supporting block 12112 is connected to the mounting sub-portion 12211, to allow the snapping member 122 to be suspended above the plate body 1211. A space in which the locking part for quick detachment 13 is movable is formed between the snapping member 122 and the plate body 1211. The plate body 1211 is further provided with an exposure hole 1219 by which a bottom of the locking part for quick detachment 13 is exposed. When the locking part for quick detachment 13 is located in the locking position 1213, the first stop projection 1322 abuts against the second stop projection 12113, that is, the second stop projection 12113 acts as a limiting function to limit the locking part for quick detachment 13 located in the locking position 1213 from continuing to move in the direction closer to the mounting boss 111.

Furthermore, in an embodiment, a side of the locking part for quick detachment 13 away from the floor plate body 12 is provided with an elongated protrusion 134 extending in a front-rear direction. The elongated protrusion 134 is connected to the main body portion 132. A bottom surface of the plate body 1211 is provided with a locking mark 1215 and an unlocking mark 1216, the locking mark 1215 is arranged corresponding to the locking position 1213, and the unlocking mark 1216 is arranged corresponding to the detachable position 1214. When the locking part for quick detachment 13 is located in the locking position 1213, the elongated protrusion 134 is positioned corresponding to the locking mark 1215. The arrangement of the elongated protrusion 134 is convenient for an installer to apply a force to the locking part for quick detachment 13, and the arrangement of the locking mark 1215 and the unlocking mark 1216 is convenient for an user to more intuitively judge whether the limiting protrusion 135 enters the first groove 12121 or the second groove 12122 according to the mark where the elongated protrusion 134 is positioned, which avoids an unstable connection between the floor plate body 12 and the mounting boss 111 caused by the locking part for quick detachment 13 being not moved in place. The elongated protrusion 134 is flush with the locking mark 1215 when the locking part for quick detachment 13 is located in the locking position 1213, and the elongated protrusion 134 is flush with the unlocking mark 1216 when the locking part for quick detachment 13 is located in the detachable position 1214.

As shown in FIG. 1 to FIG. 9, in an embodiment, the quick detachable and installable cat tree floor plate structure 1 further includes a top plate 123 and a fixing assembly 14. The top plate 123 is arranged above the bottom plate 121. The fixing assembly 14 includes a fixing member 141, a connecting member 142 and a rotating member 143. The connecting member 142 is connected to the fixing member 141. Atop surface of the top plate 123 is provided with an accommodating groove 1231 for accommodating the fixing member 141. A bottom of the accommodating groove 1231 is provided with a first through hole 1232 for the passage of the connecting member 142 and the rotating member 143. The bottom plate 121 is provided with a second through hole 1217 for the passage of the rotating member 143, the second through hole 1217 is arranged corresponding to the first through hole 1232. The rotating member 143 is rotatably connected to the connecting member 142 to allow a top surface of the rotating member 143 to abut against a bottom surface of the bottom plate 121. A top surface of the fixing member 141 is generally connected to a cushion. When it is necessary to fix the fixing member 141 on the floor plate body 12, the rotating member 143 is rotated to allow the rotating member 143 to be coincide with the connecting member 142, the fixing member 141 is placed in the accommodating groove 1231, the rotating member 143 and the connecting member 142 together pass through the first through hole 1232, the rotating member 143 passes through the second through hole 1217, and the rotating member 143 is rotated. The rotation of the rotating member 143 will not drive the connecting member 142 and the fixing member 141 to rotate together since the connecting member 142 is limited by the first through hole 1232. The rotation of the rotating member 143 allows the top surface of the rotating member 143 to abut against the bottom surface of the bottom plate 121, to limit an upward movement of the rotating member 143. The fixing member 141 is placed in the accommodating groove 1231, and the fixing member 141 abuts against a bottom wall of the accommodating groove 1231 to limit a downward movement of the fixing member 141, to fix the fixing member 141 to the floor plate body 12.

According to an embodiment of the present disclosure, the top surface of the top plate 123 is further provided with a storage groove 1233 for accommodating a mat, a blanket or a felt, etc.

Furthermore, in an embodiment, the fixing member 141 is detachably connected to the connecting member 142. According to an embodiment of the present disclosure, the fixing member 141 is provided with a connecting groove 1411, and the connecting member 142 is in sliding fit with the connecting groove 1411. In this way, the connecting member 142 can be adapted to the fixing members 141 with different dimensions, which enlarges the disclosure range of the connecting member 142.

Furthermore, in an embodiment, the quick detachable and installable cat tree floor plate structure includes at least two mounting posts 11, the number of the snapping members 122 is the same as the number of the mounting posts 11 and the snapping members 122 are arranged in one-to-one correspondence with the mounting posts 11, and the number of the locking part for quick detachments 13 is the same as the number of the snapping members 122 and the locking part for quick detachments 13 are arranged in one-to-one correspondence with the snapping members 122. A plurality of snapping members 122 are arranged for the base plate 121. Each snapping member 122 corresponds to a respective one of the mounting bosses 111. A plurality of locking part for quick detachments 13 are also provided. Each locking part for quick detachment 13 is arranged corresponding to a respective one of the plurality of snapping members 122. In this way, the stability of the floor plate body 12 can be enhanced.

Furthermore, the present disclosure also provides a cat tree 2. In an embodiment, as shown in FIG. 1 to FIG. 19, the cat tree 2 includes a mounting plate 23 and the quick detachable and installable cat tree floor plate structure 1 described above. The mounting post 11 is detachably connected to the mounting plate 23. Since the cat tree 2 adopts all the technical solutions of the embodiments described above, it has at least all the beneficial effects brought by the technical solutions of the embodiments described above, and will not be repeated here. The mounting post 11 may be detachably connected to the mounting plate 23 by a threaded fastener which may be a screw or a bolt or the like. An end of the mounting post 11 connected to the mounting plate 23 may be provided with an external thread, and the mounting plate 23 may be provided with a threaded hole cooperating with the external thread.

In an embodiment, the quick detachable and installable cat tree floor plate structure 1 further includes a decorated component 21. The decorated component 21 includes a mount 211 and a pendant 212 connected to each other, the mount 211 is snapped into the bottom plate 121, and the pendant 212 is provided with an aperture 2121; and/or the cat tree includes at least two quick detachable and installable cat tree floor plate structures 1, the cat tree 2 further includes mounting plates 23 and connecting plates 22, the mounting plates 23 are arranged corresponding to the quick detachable and installable cat tree floor plate structures 1, bottoms of the mounting posts 11 are connected to the mounting plates 23, and each of the connecting plates 22 is configured to connect any two mounting plates 23 with each other. The decorated component 21 includes the mount 211 and the pendant 212 connected to each other, the mount 211 is snapped into the bottom plate 121, and the pendant 212 is provided with an aperture 2121. A hanging rope for hanging the decorated component can be hung on the pendant 212 through the hanging hole 2121. A side wall of the mount 211 is provided with a rotary snapping element 2111, a bottom of the bottom plate 121 is provided with a mounting groove 1218, and a wall of the mounting groove 1218 is provided with a snapping protrusion configured to be snapped into the rotary snapping element 2111. In addition, the two mounting plates 23 of the two quick detachable and installable cat tree floor plate structures 1 are connected to each other as a whole by the connecting plates 22, which improves the stability of the cat tree 2.

The above is only preferable embodiments of the present disclosure and does not limit the scope of protection of the present disclosure. Any equivalent structural transformation made by utilizing the contents of the description and drawings of the present disclosure or direct/indirect disclosure in other related technical fields under the conception of the present disclosure is included in the scope of protection of the present disclosure.

The invention claimed is:

1. A quick detachable and installable cat tree floor plate structure, comprising:

a mounting post provided with a mounting boss;

a floor plate body; and at least one locking part for quick detachment, wherein the locking part for quick detachment has a locking position and a detachable position, the locking part for quick detachment being in sliding fit with the floor plate body to allow the locking part for quick detachment to reciprocate between the locking position and the detachable position, wherein when the locking part for quick detachment is located in the locking position, a snapping groove that is laterally opened is formed between the floor plate body and the locking part for quick detachment to snap the mounting boss into the snapping groove, and wherein when the locking part for quick detachment is located in the detachable position, the floor plate body is movable upward relative to the mounting boss and detachable from the mounting boss.

2. The quick detachable and installable cat tree floor plate structure of claim 1, wherein the floor plate body is provided with at least one annular limiting groove and an outer edge of the mounting boss is provided with an annular protrusion configured to be snapped into the annular limiting groove.

3. The quick detachable and installable cat tree floor plate structure of claim 2, wherein the floor plate body is provided with two annular limiting grooves and the two annular limiting grooves are arranged opposite to each other at two ends of the floor plate body, a number of locking part for quick detachments is the same as a number of the annular limiting grooves, and the locking part for quick detachments are arranged in one-to-one correspondence with the annular limiting grooves.

4. The quick detachable and installable cat tree floor plate structure of claim 3, wherein the floor plate body is provided with a limiting block, the limiting block is provided with a first groove and a second groove on a side of the limiting block facing toward the locking part for quick detachment, the first groove is arranged corresponding to the locking position, and the second groove is arranged corresponding to the detachable position, the locking part for quick detachment is provided with a limiting protrusion configured to be snapped into the first groove or the second groove, and when the locking part for quick detachment is located in the locking position, the limiting protrusion is snapped into the first groove.

5. The quick detachable and installable cat tree floor plate structure of claim 3, wherein the quick detachable and installable cat tree floor plate structure further comprises a top plate and a fixing assembly, the top plate is arranged above the floor plate body, the fixing assembly comprises a fixing member, a connecting member and a rotating member, the connecting member is connected to the fixing member, a top surface of the top plate is provided with an accommodating groove for accommodating the fixing member, a bottom of the accommodating groove is provided with a first through hole for a passage of the connecting member and the rotating member, the floor plate body is provided with a second through hole for a passage of the rotating member, the second through hole is arranged corresponding to the first through hole, and the rotating member is rotatably connected to the connecting member to allow a top surface of the rotating member to abut against a bottom surface of the floor plate body.

6. The quick detachable and installable cat tree floor plate structure of claim 2, wherein the floor plate body comprises a bottom plate and a snapping member connected to each other, the snapping member comprises a snapping portion, the snapping portion comprises a mounting sub-portion, a connecting sub-portion and a snapping sub-portion connected to each other in sequence, the mounting sub-portion is connected to the bottom plate, the mounting sub-portion, the connecting sub-portion and the snapping sub-portion together define the annular limiting groove, a top surface of the mounting boss is provided with an annular groove, the snapping sub-portion is configured to be snapped into the annular groove, and an inner side of the mounting sub-portion is configured to abut against an outer wall of the mounting boss.

7. The quick detachable and installable cat tree floor plate structure of claim 6, wherein the floor plate body is provided with a limiting block, the limiting block is provided with a first groove and a second groove on a side of the limiting block facing toward the locking part for quick detachment, the first groove is arranged corresponding to the locking position, and the second groove is arranged corresponding to the detachable position, the locking part for quick detachment is provided with a limiting protrusion configured to be snapped into the first groove or the second groove, and when the locking part for quick detachment is located in the locking position, the limiting protrusion is snapped into the first groove.

8. The quick detachable and installable cat tree floor plate structure of claim 6, wherein the quick detachable and installable cat tree floor plate structure further comprises a top plate and a fixing assembly, the top plate is arranged above the floor plate body, the fixing assembly comprises a fixing member, a connecting member and a rotating member, the connecting member is connected to the fixing member, a top surface of the top plate is provided with an accommodating groove for accommodating the fixing member, a bottom of the accommodating groove is provided with a first through hole for a passage of the connecting member and the rotating member, the floor plate body is provided with a second through hole for a passage of the rotating member, the second through hole is arranged corresponding to the first through hole, and the rotating member is rotatably connected to the connecting member to allow a top surface of the rotating member to abut against a bottom surface of the floor plate body.

9. The quick detachable and installable cat tree floor plate structure of claim 2, wherein the floor plate body is provided with a limiting block, and the limiting block is provided with a first groove and a second groove on a side of the limiting block facing toward the locking part for quick detachment, the first groove is arranged corresponding to the locking position, and the second groove is arranged corresponding to the detachable position, the locking part for quick detachment is provided with a limiting protrusion configured to be snapped into the first groove or the second groove, and when the locking part for quick detachment is located in the locking position, the limiting protrusion is snapped into the first groove.

10. The quick detachable and installable cat tree floor plate structure of claim 2, wherein the quick detachable and installable cat tree floor plate structure further comprises a top plate and a fixing assembly, the top plate is arranged above the floor plate body, the fixing assembly comprises a fixing member, a connecting member and a rotating member, the connecting member is connected to the fixing member, a top surface of the top plate is provided with an accommodating groove for accommodating the fixing member, a bottom of the accommodating groove is provided with a first through hole for a passage of the connecting member and the rotating member, the floor plate body is provided with a second through hole for a passage of the rotating member, the second through hole is arranged corresponding to the first through hole, and the rotating member is rotatably connected to the connecting member to allow a top surface of the rotating member to abut against a bottom surface of the floor plate body.

11. The quick detachable and installable cat tree floor plate structure of claim 1, wherein the locking part for quick detachment comprises a locking plate provided with a first stop protrusion, the floor plate body is provided with a second stop protrusion, and the second stop protrusion is configured to abut against the first stop protrusion to limit a travel of the locking plate.

12. The quick detachable and installable cat tree floor plate structure of claim 11, wherein the floor plate body is provided with a limiting block, the limiting block is provided with a first groove and a second groove on a side of the limiting block facing toward the locking part for quick detachment, the first groove is arranged corresponding to the locking position, the second groove is arranged corresponding to the detachable position, the locking part for quick detachment is provided with a limiting protrusion configured to be snapped into the first groove or the second groove, and when the locking part for quick detachment is located in the locking position, the limiting protrusion is snapped into the first groove.

13. The quick detachable and installable cat tree floor plate structure of claim 11, wherein the quick detachable and installable cat tree floor plate structure further comprises a top plate and a fixing assembly, the top plate is arranged above the floor plate body, the fixing assembly comprises a fixing member, a connecting member and a rotating member, the connecting member is connected to the fixing member, a top surface of the top plate is provided with an accommodating groove for accommodating the fixing member, a bottom of the accommodating groove is provided with a first through hole for a passage of the connecting member and the rotating member, the floor plate body is provided with a second through hole for a passage of the rotating member, the second through hole is arranged corresponding to the first through hole, and the rotating member is rotatably connected to the connecting member to allow a top surface of the rotating member to abut against a bottom surface of the floor plate body.

14. The quick detachable and installable cat tree floor plate structure of claim 1, wherein a side of the locking part for quick detachment away from the floor plate body is provided with an elongated protrusion extending in a front-rear direction.

15. The quick detachable and installable cat tree floor plate structure of claim 14, wherein the floor plate body is provided with a limiting block, the limiting block is provided with a first groove and a second groove on a side of the limiting block facing toward the locking part for quick detachment, the first groove is arranged corresponding to the locking position, and the second groove is arranged corresponding to the detachable position, the locking part for quick detachment is provided with a limiting protrusion configured to be snapped into the first groove or the second groove, and when the locking part for quick detachment is located in the locking position, the limiting protrusion is snapped into the first groove.

16. The quick detachable and installable cat tree floor plate structure of claim 14, wherein the quick detachable and installable cat tree floor plate structure further comprises a top plate and a fixing assembly, the top plate is arranged above the floor plate body, the fixing assembly comprises a fixing member, a connecting member and a rotating member, the connecting member is connected to the fixing member, a top surface of the top plate is provided with an accommodating groove for accommodating the fixing member, a bottom of the accommodating groove is provided with a first through hole for a passage of the connecting member and the rotating member, the floor plate body is provided with a second through hole for a passage of the rotating member, the second through hole is arranged corresponding to the first through hole, and the rotating member is rotatably connected to the connecting member to allow a top surface of the rotating member to abut against a bottom surface of the floor plate body.

17. The quick detachable and installable cat tree floor plate structure of claim 1, wherein the floor plate body is provided with a limiting block, the limiting block is provided with a first groove and a second groove on a side of the limiting block facing toward the locking part for quick detachment, the first groove is arranged corresponding to the locking position, and the second groove is arranged corresponding to the detachable position, the locking part for quick detachment is provided with a limiting protrusion configured to be snapped into the first groove or the second groove, and when the locking part for quick detachment is located in the locking position, the limiting protrusion is snapped into the first groove.

18. The quick detachable and installable cat tree floor plate structure of claim 1, wherein the quick detachable and installable cat tree floor plate structure further comprises a top plate and a fixing assembly, the top plate is arranged above the floor plate body, the fixing assembly comprises a fixing member, a connecting member and a rotating member, the connecting member is connected to the fixing member, a top surface of the top plate is provided with an accommodating groove for accommodating the fixing member, a bottom of the accommodating groove is provided with a first through hole for a passage of the connecting member and the rotating member, the floor plate body is provided with a second through hole for a passage of the rotating member, the second through hole is arranged corresponding to the first through hole, and the rotating member is rotatably connected to the connecting member to allow a top surface of the rotating member to abut against a bottom surface of the floor plate body.

19. A cat tree, comprising a mounting plate and the quick detachable and installable cat tree floor plate structure according to claim 1, wherein the mounting post is detachably connected to the mounting plate.

20. The cat tree of claim 19, wherein the quick detachable and installable cat tree floor plate structure further comprises a decorated component, the decorated component comprises a mount and a pendant connected to each other, the mount is snapped into the floor plate body, and the pendant is provided with an aperture; and/or wherein the cat tree comprises at least two of the quick detachable and installable cat tree floor plate structures, the cat tree further comprises mounting plates and connecting plates, bottoms of the mounting posts are connected to the mounting plates, and each of the connecting plates is configured to connect any two mounting plates with each other.

* * * * *